United States Patent
Wu

(10) Patent No.: US 8,751,665 B2
(45) Date of Patent: Jun. 10, 2014

(54) METHOD AND APPARATUS FOR REPORTING UNIFORM RESOURCE LOCATOR, METHOD AND APPARATUS FOR SETTING UP CONNECTION, AND COMMUNICATION SYSTEM

(75) Inventor: Huangwei Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 247 days.

(21) Appl. No.: 13/027,783

(22) Filed: Feb. 15, 2011

(65) Prior Publication Data

US 2011/0138063 A1    Jun. 9, 2011

Related U.S. Application Data

(63) Continuation of application No. PCT/CN2009/073704, filed on Sep. 2, 2009.

(30) Foreign Application Priority Data

Sep. 4, 2008   (CN)  ........................ 2008 1 0215607

(51) Int. Cl.
*G06F 15/16*      (2006.01)

(52) U.S. Cl.
USPC .......................................... 709/227; 709/228

(58) Field of Classification Search
USPC ................................................ 709/227, 228
See application file for complete search history.

(56) References Cited

U.S. PATENT DOCUMENTS

| | | | |
|---|---|---|---|
| 6,971,028 B1 * | 11/2005 | Lyle et al. ........................ | 726/25 |
| 7,529,810 B2 * | 5/2009 | Goto et al. ..................... | 709/219 |
| 7,640,247 B2 * | 12/2009 | Pudipeddi ............................. | 1/1 |
| 2003/0061315 A1 * | 3/2003 | Jin ................................. | 709/220 |
| 2003/0172183 A1 | 9/2003 | Anderson, IV et al. | |
| 2005/0132061 A1 | 6/2005 | T'Joens et al. | |
| 2006/0047803 A1 | 3/2006 | Shaik et al. | |
| 2008/0304500 A1 * | 12/2008 | Schliserman et al. ........ | 370/401 |

FOREIGN PATENT DOCUMENTS

| | | |
|---|---|---|
| CN | 101002427 A | 7/2007 |
| CN | 101132326 A | 2/2008 |
| WO | WO 01/29684 A1 | 4/2001 |

OTHER PUBLICATIONS

Lupton et al., TR-069 CPE WAN Management Protocol, Nov. 2007, DSLHome-Technical Working Group, whole document.*
Bernstein et al., TR-069 CPE WAN Management Protocol, May 2004, DSLHome—Technical Working Group, whole document.*
Lupton et al., TR-069 CPE WAN Management Protocol, Nov. 2007, DSLHome—Technical Working Group, whole document.*
Rejection Decision and Partial Translation received in Chinese Application No. 200810215607.6, mailed Aug. 20, 2012, 13 pages.
International Search Report, PCT/CN2009/073704, Date of mailing Nov. 26, 2009, 4 pages.

(Continued)

*Primary Examiner* — Andrew Chriss
*Assistant Examiner* — Jose Perez
(74) *Attorney, Agent, or Firm* — Slater & Matsil, L.L.P.

(57) ABSTRACT

A method and apparatus for reporting a Uniform Resource Locator (URL), a method and apparatus for setting up a connection, and a communication system are disclosed. The URL reporting method includes obtaining an Internet Protocol (IP) address and static information; registering the IP address and the static information with a Dynamic Domain Name System (DDNS) server; constructing a first connection request URL that carries the static information; and reporting the first connection request URL to an Auto Configuration Server (ACS).

10 Claims, 3 Drawing Sheets

(56) References Cited

OTHER PUBLICATIONS

Technical Report, DDL Forum TR-069, "CPE WAN Management Protocol," May 2004, DSL Home—Technical Working Group, pp. 1-109.
Written Opinion of the International Searching Authority, PCT/CN2009/073704, Mailed Nov. 26, 2009, 5 Pages.
First Chinese Office Action, Application No. 200810215607.6, Apr. 28, 2011, 10 Pages.
Extended European Search Report, Application No. 09811045.5, Jun. 22, 2011, 5 Pages.
Chinese Office Action and Translation received in Chinese Application No. 200810215607.6, mailed Mar. 15, 2012, 10 pages.
European Office Action for Application No. 09811045.5; Applicant, Huawei Device Co, Ltd., Mailed May 14, 2013, 5 pages.

* cited by examiner

METHOD AND APPARATUS FOR REPORTING UNIFORM RESOURCE LOCATOR, METHOD AND APPARATUS FOR SETTING UP CONNECTION, AND COMMUNICATION SYSTEM

This application is a continuation of co-pending International Application No. PCT/CN2009/073704, filed on Sep. 2, 2009, which designated the United States and was not published in English, and which claims priority to Chinese Patent Application No. 200810215607.6, filed on Sep. 4, 2008, both of which applications are incorporated herein by reference.

TECHNICAL FIELD

The present invention relates to communication technologies, and in particular, to a method and apparatus for reporting a Uniform Resource Locator (URL), a method and apparatus for setting up a connection, and a communication system.

BACKGROUND

Currently, Digital Subscriber Line (DSL) is applied as a broadband access technology in everyday life of people. As a result, the broadband technologies are applied widely, for example, Voice over Internet Protocol (VoIP), and Internet Protocol Television (IPTV). Various equipment types based on the Internet Protocol (IP) come forth to implement such applications or combinations of such applications. An IP terminal for applying the foregoing broadband technology in the household is known as a Customer Premises Equipment (CPE). In practical applications, an Auto Configuration Server (ACS) configures the CPE automatically so that the CPE can work normally without being set by the user.

In order for the ACS to configure the CPE automatically, the CPE needs to provide a ConnectionRequestURL message. The connection request URL is generated by the CPE, and includes the IP address, port number and path of the CPE, for example, 201.12.34.56:8765/CPE path. Through this message, the ACS can communicate with the CPE actively. Specifically, if the ACS needs to set up a connection with the CPE, the ACS sends an HTTP Get request to the CPE through the Hyper Text Transfer Protocol (HTTP) according to the connection request URL. After receiving the request, the CPE authenticates the ACS, and initiates setup of the connection to the ACS.

To implement the foregoing procedure, the ACS needs to store the connection request URL sent by the CPE so as to send the request to the CPE anytime. In practical applications, the CPE can keep the port and path used by the connection request URL basically unchanged. However, for the IP address, in a DSL network, the Wide Area Network (WAN)-side IP address obtained by the CPE is probably allocated by a broadband operator dynamically. Consequently, the IP address varies on every occasion of dialup. In order for the ACS to send a request to the CPE anytime, the ACS server needs to store the latest connection request URL of the CPE. Therefore, the connection request URL needs to be carried in every message when the CPE communicates with the ACS so that the ACS can check and update the connection request URL of the CPE in time.

In the prior art, because the CPE needs to add the connection request URL into every message when communicating with the ACS, the processing load of the CPE increases, and the processing efficiency of the CPE decreases.

SUMMARY OF THE INVENTION

The embodiments of the present invention provide a method and apparatus for reporting a URL, a method and apparatus for setting up a connection, and a communication system. Through the technical solution under embodiments of the present invention, the CPE does not need to add the connection request URL into every message when communicating with the ACS, the processing load of the CPE is reduced, and the processing efficiency of the CPE is improved.

A method for reporting a URL in an embodiment of the present invention includes obtaining an IP address and static information. The IP address and the static information are registered with a Dynamic Domain Name System (DDNS) server. A first connection request URL that carries the static information is constructed and the first connection request URL is reported to the ACS.

A method for setting up a connection in an embodiment of the present invention includes sending an IP address query message to a DDNS server, where the IP address query message carries static information of a CPE. An IP address query response message is received from the DDNS server, where the IP address query response message carries an IP address corresponding to the static information. A connection setup message is sent to the CPE according to the IP address.

An apparatus for reporting a URL in an embodiment of the present invention includes an obtaining unit that is adapted to obtain an IP address and static information. A registering unit is adapted to register the IP address and the static information obtained by the obtaining unit with a DDNS server. A constructing unit is adapted to construct a connection request URL that carries the static information. A reporting unit is adapted to report the connection request URL constructed by the constructing unit.

An apparatus for setting up a connection in an embodiment of the present invention includes an IP address query message sending unit that is adapted to send an IP address query message that carries static information of a CPE. A receiving unit is adapted to receive an IP address query response message that carries an IP address corresponding to the static information. A connection setup message sending unit is adapted to send a connection setup message according to the IP address received by the receiving unit.

A communication system provided in an embodiment of the present invention includes a CPE that is adapted to obtain an IP address and static information, to register the IP address and the static information with a DDNS server, to construct a connection request URL that carries the static information, to report the connection request URL, and to receive a connection setup message. An ACS is adapted to send an IP address query message that carries the static information of the CPE, to receive an IP address query response message that carries an IP address corresponding to the static information, and to send a connection setup message according to the IP address. The DDNS server is adapted to register the IP address and the static information, to receive the IP address query message, and to send the IP address query response message.

In the technical solution under the present invention, a connection request URL that carries static information is sent to the ACS, and the ACS may obtain the IP address corresponding to the static information from the DDNS server and set up a connection with the CPE through the IP address. Therefore, even if the IP address of the CPE keeps changing, the static information keeps unchanged, the CPE does not need to add the connection request URL into every message when communicating with the ACS, the processing load of the CPE is reduced, and the processing efficiency of the CPE is improved.

BRIEF DESCRIPTION OF THE DRAWINGS

To make the technical solution under the present invention or in the prior art clearer, the following outlines the accompanying drawings involved in the description of the embodiments of the present invention or the prior art. Apparently, the accompanying drawings outlined below are exemplary only and not exhaustive, and persons of ordinary skill in the art can derive other drawings from such accompanying drawings without any creative effort.

DETAILED DESCRIPTION OF ILLUSTRATIVE EMBODIMENTS

The technical solution under the present invention is described in detail with reference to embodiments and accompanying drawings. Evidently, the embodiments herein are merely representative of particular embodiments of the present invention, and shall be regarded as illustrative in nature and not exhaustive or restrictive. All other embodiments, which can be derived by those skilled in the art from the embodiments given herein without any creative efforts, shall fall within the scope of the present invention.

Figure 1:
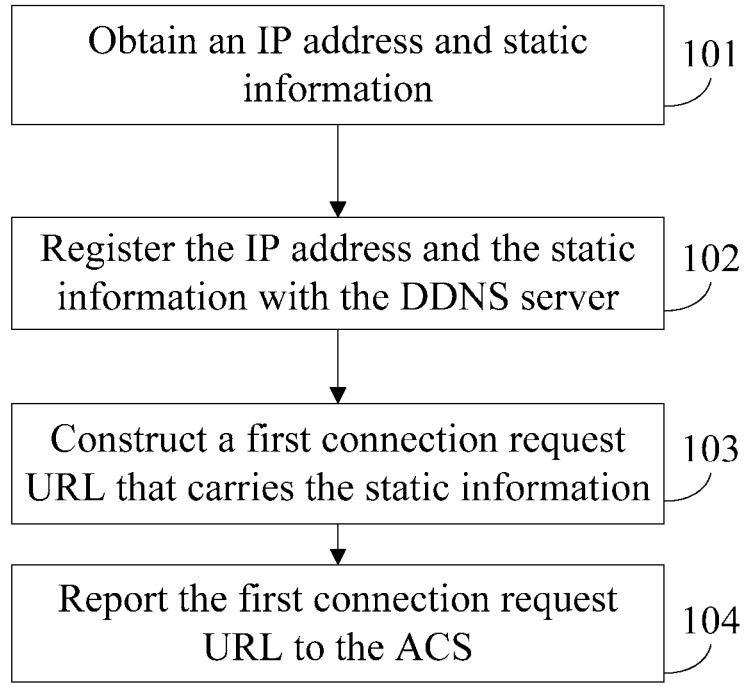
FIG. 1 is a flowchart of a method for reporting a URL according to an embodiment of the present invention.

First, a URL reporting method is described. The URL reporting method deals with a processing procedure of the CPE. FIG. 1 is a flowchart of the first embodiment of the URL reporting method. The method includes the following steps.

101. Obtain an IP address and static information.

This IP address is obtained by the CPE from the network through dialup or by other means. The static information is identification information of the CPE, and is generally unchanged. For example, the static information may be a domain name registered by the CPE with the DDNS server.

102. Register the IP address and the static information with the DDNS server.

Specifically, an update message is sent to the DDNS server to register the IP address and the static information. If the DDNS server does not store the IP address corresponding to the static information, the DDNS server sets up a mapping relation between the IP address and the static information; if the DDNS server has stored the mapping relation between the static information and another IP address, the DDNS server substitutes this IP address for the other IP address after receiving the update message. In this way, the corresponding IP address can be obtained from the DDNS server once the static information is known.

103. Construct a first connection request URL that carries the static information.

The process of constructing the first connection request URL may be: substituting the static information for the IP address in the connection request URL that carries the IP address, and obtaining the first connection request URL; or, constructing a new first connection request URL that carries the static information.

104. Report the first connection request URL to the ACS.

After the first connection request URL is reported to the ACS, the ACS knows the static information of the CPE, and can obtain the IP address of the CPE through the DDNS server, and can communicate with the CPE anytime.

In the foregoing method embodiment, a connection request URL that carries static information is sent to the ACS. Therefore, even if the IP address of the CPE keeps changing, the static information keeps unchanged, the CPE does not need to add the connection request URL into every message when communicating with the ACS, the processing load of the CPE is reduced, and the processing efficiency of the CPE is improved.

Specifically, if the CPE has never sent a connection request URL to the ACS, the CPE may send a connection request URL to the ACS.

Because the IP address obtained by the CPE from the network keeps changing, to ensure accuracy of the mapping relation between the static information of the CPE and the IP address, which is maintained by the DDNS, if the CPE has obtained a new different IP address, the URL reporting method in this embodiment may further include registering the new IP address and static information with the DDNS server, which substitutes a new IP address for the old IP address to ensure the accurate mapping relation between the static information and the IP address.

If the connection request URL is the first connection request URL, because the connection request URL carries not only static information, but also port number and path information, the connection request URL needs to be sent to the ACS again once the port number, and/or path information, and/or static information in the connection request URL changes. In this way, the changed port number, and/or changed path information, and/or changed static information are sent to the ACS to ensure that the ACS stores the correct connection request URL. Therefore, once the port number changes, the URL reporting method in this embodiment may further include constructing a second connection request URL that carries the static information and the changed port number and reporting the second connection request URL to the ACS.

Once the path information changes, the URL reporting method in this embodiment may further include constructing a third connection request URL that carries the static information and the changed path information and reporting the third connection request URL to the ACS.

Once the path information and the port number change, the URL reporting method in this embodiment may further include constructing a third connection request URL that carries the static information, the changed path information, and the changed port number and reporting the third connection request URL to the ACS.

If the ACS stores no connection request URL of the CPE for certain reasons, the ACS may send a query message to the CPE after receiving the message sent by the CPE, with a view to querying the connection request URL of the CPE. In this case, the URL reporting method in this embodiment may further include receiving a query message from the ACS and sending a connection request URL to the ACS in response to the query message.

The ACS receives the connection request URL to ensure that it stores a correct connection request URL, and ensure that the ACS can set up a connection with the CPE anytime.

Figure 2:
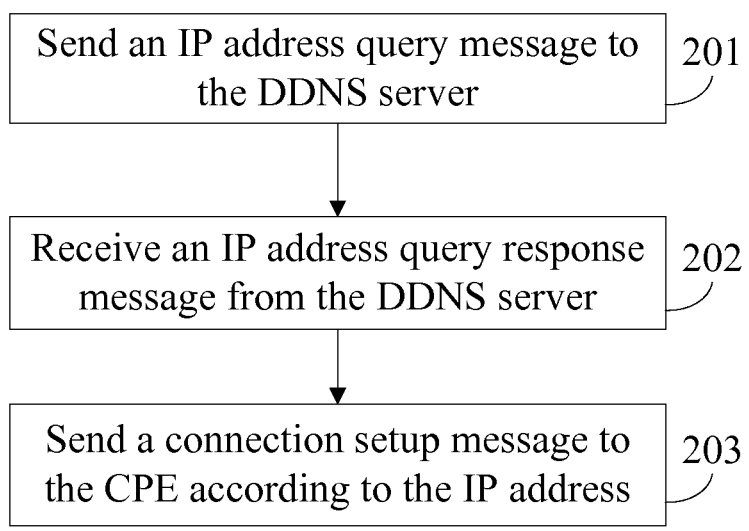
FIG. 2 is a flowchart of a method for setting up a connection according to a first embodiment of the present invention.

Second, a method for setting up a connection is described. The connection setup method in an embodiment of the present invention deals with a processing procedure of the ACS. FIG. 2 is a flowchart of the first embodiment of the connection setup method. The method includes the following steps.

201. Send an IP address query message to a DDNS server, where the IP address query message carries static information of a CPE.

Because the connection request URL received by the ACS from the CPE carries the static information of the CPE, the ACS can set up a connection with the CPE correctly, and can obtain the IP address corresponding to the static information of the CPE through the DDNS server.

202. Receive an IP address query response message from the DDNS server, where the IP address query response message carries an IP address corresponding to the static information of the CPE.

203. Send a connection setup message to the CPE according to the IP address.

After obtaining the IP address of the CPE from the DDNS server, the ACS may send a connection setup message to the CPE according to the obtained IP address, thus setting up a network connection to the CPE.

In this embodiment, the ACS obtains the IP address corresponding to the static information from the DDNS server, and sets up a connection with the CPE according to the IP address. Therefore, even if the IP address of the CPE keeps changing, the static information keeps unchanged, the CPE does not need to add the connection request URL into every message when communicating with the ACS, the processing load of the CPE is reduced, and the processing efficiency of the CPE is improved.

Further, if the ACS stores no connection request URL of the CPE, before sending the IP address query message to the DDNS server, the connection setup method in this embodiment may include sending a query message to the CPE to query the connection request URL of the CPE and receiving the connection request URL from the CPE, where the connection request URL carries the static information of the CPE.

Figure 3:
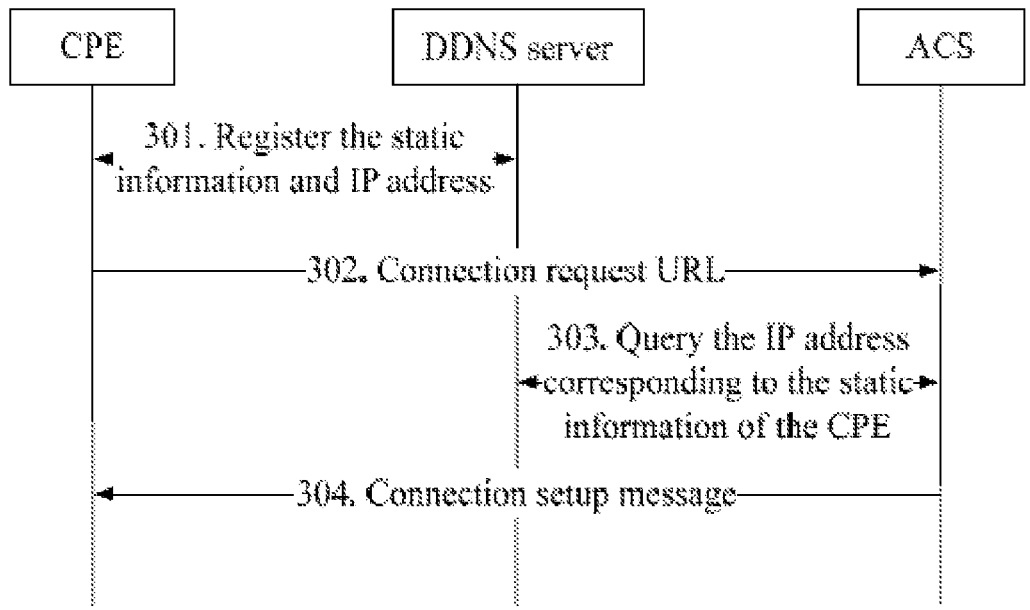
FIG. 3 is a flowchart of a method for setting up a connection according to a second embodiment of the present invention.

FIG. 3 is a signaling flowchart of a method for setting up a connection in the second embodiment of the present invention, and describes the signaling process between the CPE, the DDNS server, and the ACS. The method includes the following steps.

301. The CPE registers the static information and the IP address information with the DDNS server.

After obtaining the WAN-side IP address, the CPE registers the static information and the IP address with the DDNS server through its DDNS client. Therefore, the DDNS server can update the mapping relation between the static information of the CPE and the WAN-side IP address.

302. The CPE reports the connection request URL to the ACS.

The IP address part in the connection request URL reported by the CPE to the ACS is the static information of the CPE in step 301. Specifically, the CPE may report the connection request URL to the ACS in the following cases:

the CPE has never reported the connection request URL to the ACS before; or the connection request URL of the CPE changes; or the ACS address maintained on the CPE changes; or the ACS queries the CPE about the connection request URL.

303. The ACS queries the DDNS server about the IP address corresponding to the static information of the CPE.

When the ACS needs to send a connection setup request to the CPE, the ACS queries the DDNS server about the IP address corresponding to the static information in the connection request URL reported by the CPE.

304. The ACS sends a connection setup message to the CPE to initiate a connection.

The ACS initiates a connection to the CPE according to the connection request URL provided by the CPE and the IP address of the CPE obtained in step 303.

In this embodiment, the CPE sends a connection request URL that carries the static information to the ACS. Therefore, the ACS can obtain the IP address corresponding to the static information from the DDNS server according to the static information, and sets up a connection with the CPE according to the IP address. Even if the IP address of the CPE keeps changing, the static information keeps unchanged, the CPE does not need to add the connection request URL into every message when communicating with the ACS, the processing load of the CPE is reduced, and the processing efficiency of the CPE is improved.

Figure 4:
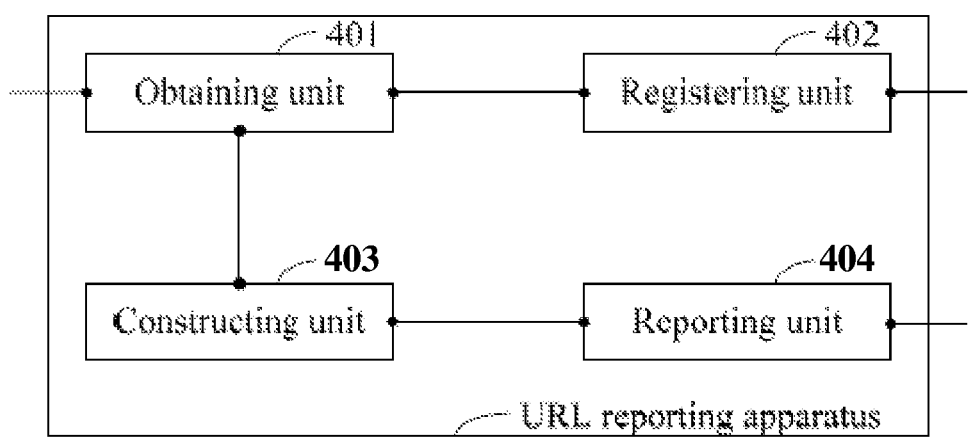
FIG. 4 shows a structure of an apparatus for reporting a URL according to an embodiment of the present invention.

The following describes an apparatus for reporting a URL in an embodiment of the present invention. As shown in FIG. 4, the apparatus includes an obtaining unit 401 that is adapted to obtain an IP address and static information. A registering unit 402 is adapted to register the IP address and the static information obtained by the obtaining unit 401 with a DDNS server. A constructing unit 403 is adapted to construct a connection request URL that carries the static information. A reporting unit 404 is adapted to report the connection request URL constructed by the constructing unit.

Through the URL reporting apparatus in this embodiment, a connection request URL that carries static information is sent to the ACS. Therefore, even if the IP address of the CPE keeps changing, the static information keeps unchanged, the CPE does not need to add the connection request URL into every message when communicating with the ACS, the processing load of the CPE is reduced, and the processing efficiency of the CPE is improved.

Further, the URL reporting apparatus in this embodiment may include a receiving unit that is adapted to receive a query message.

In this case, the reporting unit 404 is further adapted to send the connection request URL constructed by the constructing unit 403 after the receiving unit receives the query message.

The URL reporting apparatus in this embodiment may serve as a CPE, for example, a home gateway.

Figure 5:
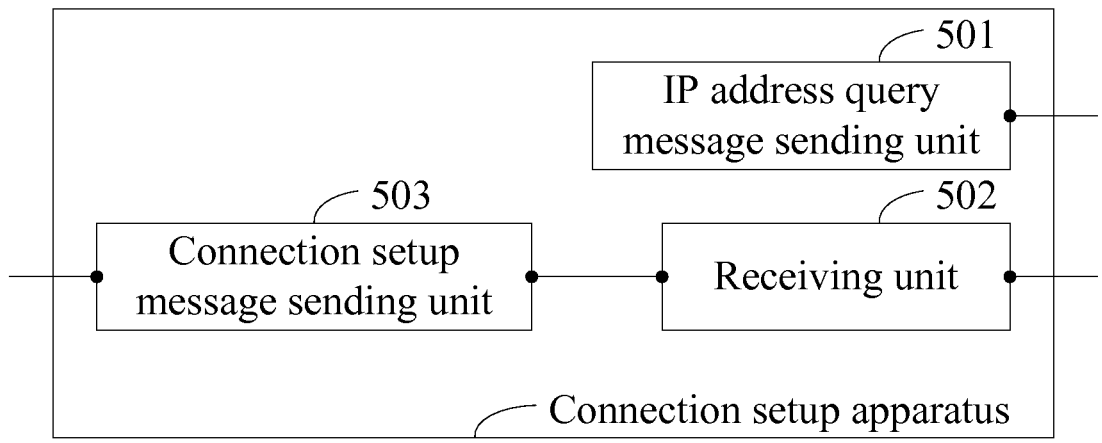
FIG. 5 shows a structure of an apparatus for setting up a connection according to an embodiment of the present invention.

FIG. 5 shows a structure of a connection setup apparatus provided in an embodiment of the present invention. The apparatus includes an IP address query message sending unit 501 that is adapted to send an IP address query message that carries static information of a CPE. A receiving unit 502 is adapted to receive an IP address query response message that carries an IP address corresponding to the static information of the CPE. A connection setup message sending unit 503 is adapted to send a connection setup message according to the IP address received by the receiving unit 502.

Through the connection setup apparatus in this embodiment, the ACS obtains the IP address corresponding to the static information from the DDNS server, and sets up a connection with the CPE according to the IP address. Therefore, even if the IP address of the CPE keeps changing, the static information keeps unchanged, the CPE does not need to add the connection request URL into every message when communicating with the ACS, the processing load of the CPE is reduced, and the processing efficiency of the CPE is improved.

The connection setup apparatus provided in this embodiment may further include a query message sending unit, adapted to send a query message.

In this case, the receiving unit 502 is further adapted to receive a connection request URL that is sent in response to the query message. The connection request URL carries the static information of the CPE.

The IP address query message sending unit 501 sends the IP address query message only after the receiving unit 502 receives the connection request URL.

The connection setup apparatus provided in this embodiment may serve as an ACS.

Figure 6:
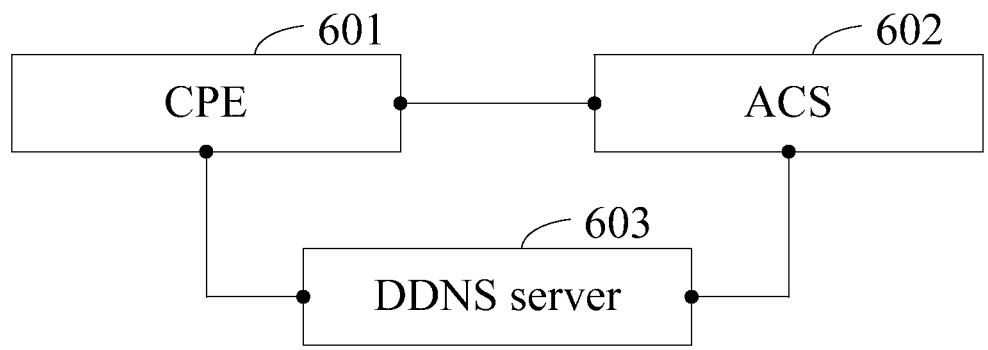
FIG. 6 shows a structure of a communication system according to an embodiment of the present invention.

FIG. 6 shows a structure of a communication system in an embodiment of the present invention. The communication system includes a CPE 601 that is adapted to obtain an IP address and static information, to register the IP address and the static information with a DDNS server, to construct a connection request URL that carries the static information, to report the connection request URL, and to receive a connection setup message.

An ACS 602 is adapted to: send an IP address query message that carries the static information of the CPE, to receive an IP address query response message that carries an IP address corresponding to the static information, and to send a connection setup message according to the IP address. A DDNS server 603 is adapted to register the IP address and the static information, to receive the IP address query message, and to send the IP address query response message.

It should be noted that the units included in the apparatus and system above are sorted according to functional logics, but are not limited to such sorting. Any sorting of the units is appropriate only if the corresponding functions of the units are implemented. The names of the functional units are given herein for the purpose of identification only, and are not intended to limit the scope of the present invention.

In this embodiment, the CPE sends a connection request URL that carries the static information to the ACS. Therefore, the ACS can obtain the IP address corresponding to the static information from the DDNS server according to the static information, and sets up a connection with the CPE according to the IP address. Even if the IP address of the CPE keeps changing, the static information keeps unchanged, the CPE does not need to add the connection request URL into every message when communicating with the ACS, the processing load of the CPE is reduced, and the processing efficiency of the CPE is improved.

Persons of ordinary skill in the art should understand that all or part of the steps of the method provided in any embodiment of the present invention above may be implemented by a program instructing relevant hardware. The program may be stored in a computer readable storage medium. When the program runs, all or part of the steps of the method provided in any embodiment of the present invention above may be performed. The storage medium may be a Read Only Memory (ROM), a magnetic disk, or a Compact Disk-Read Only Memory (CD-ROM).

Detailed above are a method and apparatus for reporting a URL, a method and apparatus for setting up a connection, and a communication system under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for a Customer Premises Equipment (CPE) to report a Uniform Resource Locator (URL), the method comprising:

obtaining an Internet Protocol (IP) address and static information;

registering the IP address and the static information with a Dynamic Domain Name System (DDNS) server;

constructing a first connection request URL that carries the static information but does not carry the IP address; and reporting the first connection request URL to an Auto Configuration Server (ACS), wherein the ACS obtains the IP address from the DDNS server through the static information in the first connection request URL, and wherein if a new IP address is obtained, the method further comprising:

registering the new IP address and the static information with the DDNS server, which substitutes the new IP address for the IP address;

wherein all connection request URL reported by the CPE to the ACS never carries the IP address.

2. The method according to claim 1, wherein the connection request URL comprises a port number and, if the port number changes, the method further comprises:

constructing a second connection request URL that carries the static information and the changed port number but does not carry the IP address; and reporting the second connection request URL to the ACS.

3. The method according to claim 1, wherein the connection request URL comprises path information and, if the path information changes, the method further comprises:

constructing a third connection request URL that carries the static information and the changed path information but does not carry the IP address; and reporting the third connection request URL to the ACS.

4. The method according to claim 2, wherein the connection request URL comprises path information and, if the path information changes, the method further comprises:

constructing a third connection request URL that carries the static information and the changed path information but does not carry the IP address; and reporting the third connection request URL to the ACS.

5. The method according to claim 1, wherein before reporting the first connection request URL to the ACS, the method further comprises receiving a query message from the ACS.

6. The method according to claim 1, wherein the static information comprises a domain name.

7. An apparatus for reporting a Uniform Resource Locator (URL), the apparatus comprising a processor configured to:

obtain an Internet Protocol (IP) address and static information;

register the IP address and the static information obtained with a Dynamic Domain Name System (DDNS) server;

construct a connection request URL that carries the static information but does not carry the IP address; and report the connection request URL constructed to an Auto Configuration Server (ACS), wherein the ACS obtains the IP address from the DDNS server through the static information in the first connection request URL, and wherein the processor is further configured to, if a new IP address is obtained, register the new IP address and the static information with the DDNS server, which substitutes the new IP address for the IP address;

wherein all connection request URL reported by the processor to the ACS never carries the IP address.

8. The apparatus according to claim 7, the processor is further configured to receive a query message, then send the constructed connection request URL.

9. The apparatus according to claim 7, wherein the static information comprises a domain name.

10. A communication system, comprising:

a Customer Premises Equipment (CPE), adapted to obtain an Internet Protocol (IP) address and static information, adapted to register the IP address and the static information with a Dynamic Domain Name System (DDNS) server, adapted to construct a connection request URL that carries the static information but does not carry the IP address, adapted to report the connection request URL, and adapted to receive a connection setup message;

an Auto Configuration Server (ACS), adapted to send an IP address query message that carries the static information of the CPE, adapted to receive an IP address query response message that carries an IP address corresponding to the static information, and adapted to send the connection setup message according to the IP address; and the DDNS server, adapted to register the IP address and the static information, adapted to receive the IP address query message, and adapted to send the IP address query response message, wherein if the CPE obtains a new IP address, the CPE registers the new IP address and the static information with the DDNS server, which substitutes the new IP address for the IP address;

wherein all connection request URL reported by the CPE to the ACS never carries the IP address.

\* \* \* \* \*